United States Patent [19]

Gorgone et al.

[11] 4,352,559
[45] Oct. 5, 1982

[54] LOGARITHMIC PRIMARY TESTING SYSTEM FOR SECURITY VALIDATION

[75] Inventors: Robert L. Gorgone, Mentor; Alan J. Kovach, Cleveland; Frank A. Novak, Seven Hills, all of Ohio

[73] Assignee: Ardac, Inc., Eastlake, Ohio

[21] Appl. No.: 152,636

[22] Filed: May 23, 1980

Related U.S. Application Data

[63] Continuation of Ser. No. 922,637, Jul. 7, 1978, abandoned, which is a continuation of Ser. No. 740,415, Nov. 10, 1976, abandoned.

[51] Int. Cl.$^3$ .................. G06K 9/82; H01J 40/14; G01N 9/24; G01N 21/17
[52] U.S. Cl. .................. 356/71; 250/214 R; 250/556; 330/110
[58] Field of Search ......... 356/71; 250/214 R, 214 A, 250/214 AG, 214 C, 237 G; 330/59, 103, 110; 328/145, 223

[56] References Cited

U.S. PATENT DOCUMENTS

| | | | |
|---|---|---|---|
| 3,374,361 | 3/1968 | Callis | 328/145 |
| 3,457,421 | 7/1969 | Bayha | 356/71 |
| 3,999,060 | 12/1976 | Skagerlund | 330/110 |

OTHER PUBLICATIONS

Graeme et al., (Editors), "Operational Amplifiers Design & Applications", McGraw-Hill Book Co., 1971, pp. 236-268.

Primary Examiner—William H. Punter
Attorney, Agent, or Firm—Oldham, Oldham, Hudak & Weber Co.

[57] ABSTRACT

Apparatus for performing tests for determining the validity of a paper purported to be a valid instrument is presented. Fundamentally, the invention comprises a tray for receiving a paper offered as a valid instrument and maintaining the same in sliding relationship between a light source and reticle. A photocell is operatively connected to the reticle and senses light passing from the light source and through the paper and reticle. The output of the photocell is applied to an operational amplifier having a dynamic feedback network and the output of this amplifier is characteristic of both a grid pattern upon the paper and the optical density thereof. This output is then passed to an amplifier circuit which establishes an optical density domain and is operative to pass a signal only if the paper falls within such domain. This output is then passed to appropriate integrating and comparator circuitry to ultimately determine the validity of the paper.

13 Claims, 15 Drawing Figures

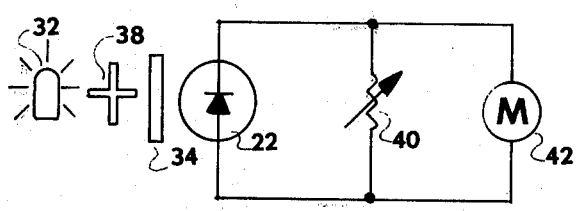
FIG. 8
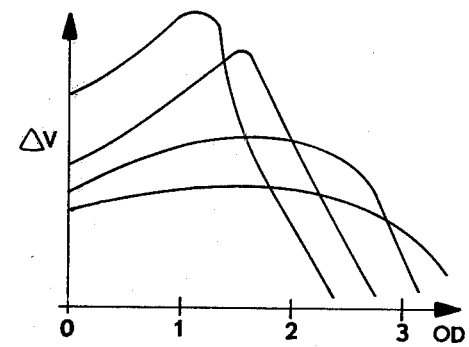
FIG. 9
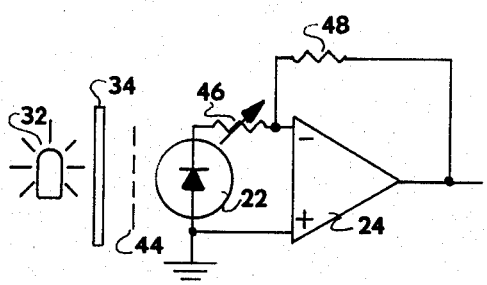
FIG. 10
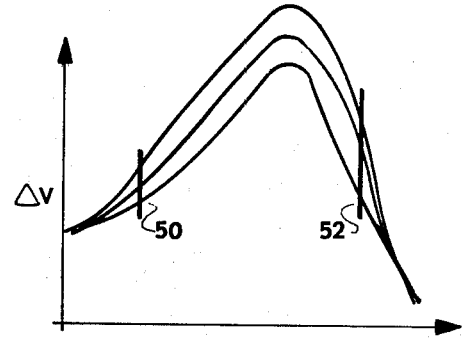
FIG. 11
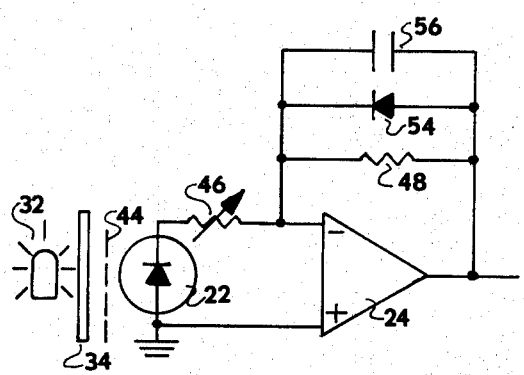
FIG. 12
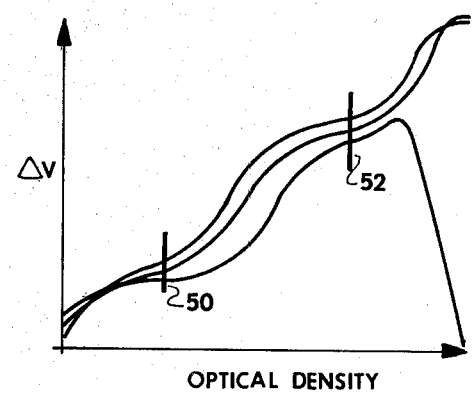
FIG. 13
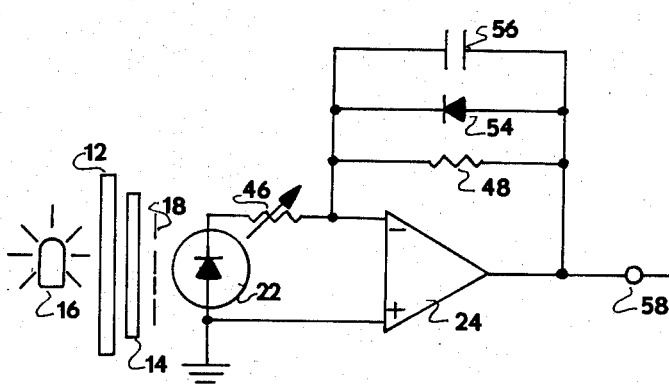
FIG. 14
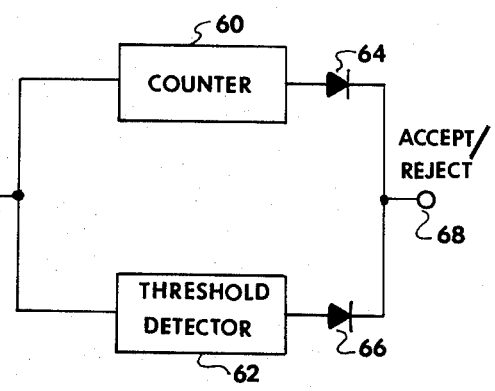

LOGARITHMIC PRIMARY TESTING SYSTEM FOR SECURITY VALIDATION

This is a continuation of application Ser. No. 922,637, filed July 7, 1978, now abandoned, which is a continuation of application Ser. No. 740,415, filed Nov. 10, 1976, now abandoned.

BACKGROUND OF THE INVENTION

The invention presented herein deals in the art of apparatus for testing and determining the validity of a paper being offered as a valid security, note, currency, or the like. In the past, security validation devices have been developed wherein grid patterns on the security are tested by means of a reticle and photocell positioned on a side of the paper opposite that of a light source. Movement of the reticle and/or the paper creates relative movement between the reticle and grid pattern and a determination of the validity of the paper is then made upon the basis of the registrations achieved between the reticle and the grid pattern. However, with the advent of modern-day photocopying devices capable of reproducing documents to the finest detail, it has been found that prior art validation devices may accept photocopies as valid securities due to the high quality of reproduction of the test grid by the photocopy device.

It has thus become necessary to extend the validation test currently utilized to incorporate tests upon other characteristics of the security which are present in a valid security but absent in a photocopy. To this end, it has been found that the optical density of a note and photocopy are generally quite different and that a test operating upon both a characteristic grid pattern and the optical density of the paper will not easily be deceived by a photocopy or other facsimile.

OBJECTS OF THE INVENTION

In light of the foregoing, it is an object of the instant invention to present a logarithmic primary testing system for security validation wherein a test of the optical density of the paper being passed as a security is tested along with the characteristic grid pattern.

Yet another object of the invention is to present a logarithmic primary testing system for security validation wherein the characteristic differences in optical density between a photocopy and a valid instrument are greatly enhanced to more clearly and readily distinquish between the two.

Still another object of the invention is to present a logarithmic primary testing system for security validation which is simplistic in design, reliable in operation, inexpensive to construct, and readily conducive to implementation with presently-existing validation devices.

SUMMARY OF THE INVENTION

The foregoing objects and other objects of the invention which will become apparent as the detailed description proceeds are achieved by: apparatus for performing tests for determining the validity of a paper purported to be a valid instrument, comprising: a light source; a reticle in juxtaposition to and receiving light from said light source; means interpositioned between said light source and said reticle for receiving the paper and providing relative movement between said reticle and the paper, such movement chopping the light passing from said source and through said reticle; and sensing means operatively connected to said reticle for receiving the light passing therethrough and testing such light as to the frequency of such chopping and the optical density of the paper to determine the validity of the paper.

DESCRIPTION OF THE DRAWINGS

For a complete understanding of the objects, techniques, and structure of the invention, reference should be had to the following detailed description and accompanying drawings wherein:

FIG. 8 is a circuit utilized for testing the dynamic characteristics of a photocell with the light incident thereto being chopped;

FIG. 9 is a family of curves resulting from operation of the circuit of FIG. 8 which the load resistance thereof being varied;

FIG. 10 is a circuit testing the dynamic characteristics of a photocell with the light incident thereto being chopped at different frequencies;

FIG. 11 is a family of curves relating to the operation of the circuitry of FIG. 10;

FIG. 12 is a schematic of the circuitry of FIG. 10 with a dynamic feedback being interposed across the operational amplifier to achieve a nonlinear gain;

FIG. 13 is a family of curves achieved from the operation of the circuitry of FIG. 12;

FIG. 14 is a security validation circuit according to the teachings of the invention and capitalizing upon the nonlinear gain of the operational amplifier thereof.

DETAILED DESCRIPTION OF THE PREFERRED EMBODIMENT

Figure 1:
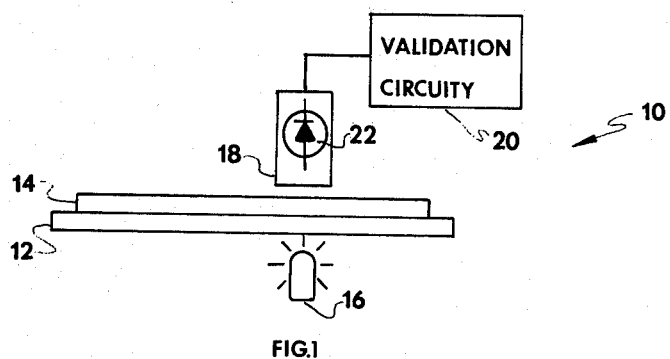
FIG. 1 is an illustrative showing of a security validation apparatus as the same is presently known in the art.

Referring now to the drawings and more particularly FIG. 1, it can be seen that a security validation device is designated generally by the numeral 10 and includes a tray 12 for receiving thereupon a security or other paper document to be tested for validity. The tray 12 is preferably of a highly transparent nature and slidable upon ways (not shown) to position a portion of the security 14 having a characteristic grid thereon in juxtaposition between a lamp or other light source 16 and a reticle 18. The light from the lamp 16 passes through the tray 12 and security 14 and impinges upon a photocell 22 which emits a characteristic current dependent upon the intensity of light incident thereto. Relative movement between the reticle 18 and security 14 results in a characteristic pulsating signal output from the photocell 22 which is received by the validation circuitry 20. Such circuitry may include a counting circuit for sensing the number of times that the reticle and grid pattern of the security 14 enter into and out of registration and may further include amplitude detection means for determining whether the output pulses from the photocell 22 are of sufficient amplitude to be characteristic of a valid instrument. In any event, the circuitry of FIG. 1 basically comprises a pattern-matching device.

Figure 2:
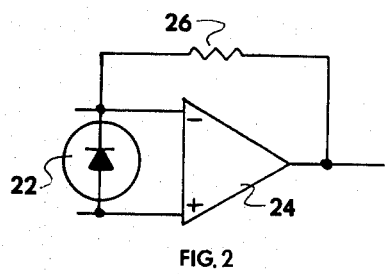
FIG. 2 is a circuit showing the utilization of a photocell in the short circuit mode of operation.
Figure 3:
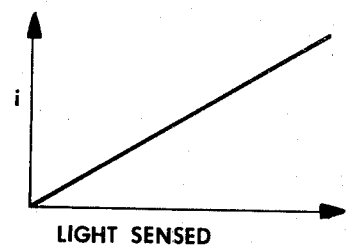
FIG. 3 is a curve relating the output current of the circuitry of FIG. 2 to the light sensed by the photocell thereof.

With reference now to FIG. 2, it can be seen that the photocell utilized in the circuitry of FIG. 1 may be connected to an operational amplifier 24 in the manner shown and be operated in what is known as the short-circuit mode. Of course, a feedback resistor 26 may be provided from the output to the negative input for purposes of achieving appropriate gain. For a fixed value of the resistor 26, the output of the operational amplifier is shown as a function of the light sensed by the photocell 22 in the curve of FIG. 3; it being readily apparent that in the short circuit or current mode of operation, the output current is a linear function of the light sensed by the photocell.

Figure 4:
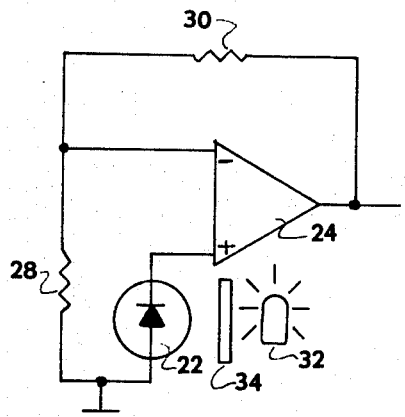
FIG. 4 is a circuit schematic of a photocell functioning in the open circuit mode.
Figure 5:
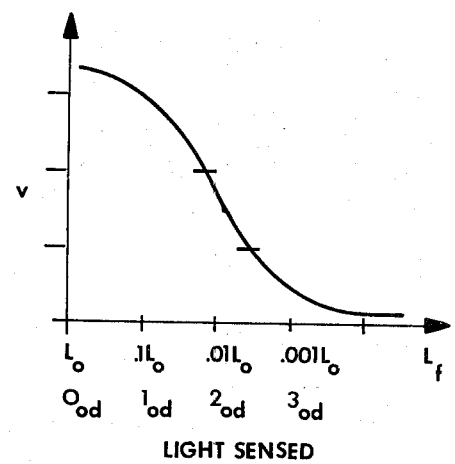
FIG. 5 is a curve showing the relationship of the output voltage of the circuit of FIG. 4 as a function of the light sensed by the photocell thereof.

It is also known that a photocell 22, such as that utilized in the device of FIG. 1, may be operated in the voltaic or open circuit mode as shown in FIG. 4. In such operation, the photocell 22 is interconnected between a ground reference and the positive input of the amplifier 24 rather than being interconnected between the inputs as shown in FIG. 2. As shown in FIG. 5, for fixed values of input and feedback resistors 28, 30, the output voltage of the circuitry of FIG. 4 becomes a logarithmic function of the light sensed. The graph of FIG. 5 depicts the output voltage as a function of the light sensed with the latter being designated in terms of optical density. As is understood in the art, with a lamp source 32 casting an initial intensity of light $L_o$ upon a media 34 having some characteristic optical density associated therewith, only a certain portion of the light $L_f$ will emit therefrom. By definition, the optical density of any given media is a logarithmic function defined by the equation $OD = \log L_o/L_f$ where OD is the optical density, $L_o$ is the initial light level entering the media and $L_f$ is the final light level emitted from the media. It should thus be readily apparent from viewing the circuitry of FIG. 4 and the related curve of FIG. 5 that the output voltage of the circuitry of FIG. 4 is dependent upon the optical density of the media 34 for any given initial light level $L_o$ emitted from the lamp 32. It is, of course, the final light level $L_f$ which impinges upon the photocell 22. As shown, when the photocell 22 is connected in the open circuit mode as in FIG. 4, the output voltage bears a logarithmic relationship to the light sensed by the cell 22, or a linear relationship to the optical density of the media 34, and does so over a substantial range as shown in the graph of FIG. 5.

The characteristic shown in FIG. 5 allows for the gridmatch testing of the prior art in that the passing of the paper and reticle into and out of registration changes the media through which the light passes before impinging upon the photocell 22 back and forth between low and high optical density characteristics and hence a pulsating signal is achieved.

Figure 6:
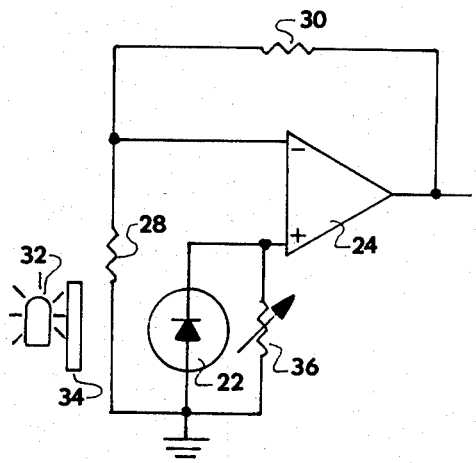
FIG. 6 is a circuit schematic of a photocell sensing device operating in the open circuit mode and having a variable resistor in shunt with the photocell.
Figure 7:
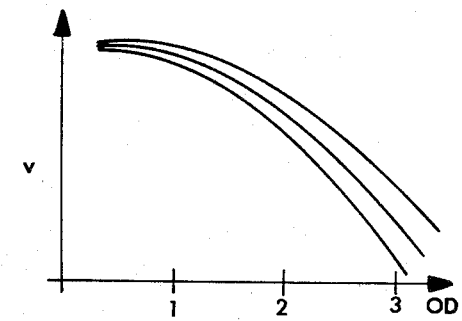
FIG. 7 is a family of curves, each for a different value of shunt resistance, and establishing the output voltage of the circuit of FIG. 6 as a function of the light sensed by the photocell thereof.

Referring now to FIG. 6, it can be seen that there is again provided a circuit of a nature similar to that of FIG. 4 but wherein a variable resistor 35 is interconnected in shunt with the photocell 22. Utilizing the structure of FIG. 6 and by varying the resistor 36, a family of curves may be developed as shown in FIG. 7, one curve for each value of the resistor 36. It was thus found that by varying the shunt resistor, the AC gain of the circuit of FIG. 6 could be varied. In other words, the slope of the curve relating output signal to optical density could be varied as a function of the loading of the cell.

As discussed hereinabove, the test for validating a security requires a relative movement between the reticle and the security, such movement resulting in a chopping of the light emitted from the light source to the photocell. The light effect upon the photocell is thus similar to the circuitry shown in FIG. 8 wherein a chopper 38 (which could be a grid, rotating disk, or the like) is interposed between the light source 32 and the photocell 22. A variable resistor 40 is connected in shunt with the photocell 22 as is a digital volt meter 42. Again a media 34 is interposed between the light source 32 and the sensor cell 22. It should be appreciated that the output of the sensor cell 22 will be of an AC on DC nature due to the chopping effect via the chopper 38. The actual frequency of this signal is dependent upon the characteristics of the grid pattern on the security which is being tested and, correspondingly, upon the characteristics of the reticle used. A family of curves depicting this output signal as $\Delta V$ as measured at the meter 42 is then developed as shown in FIG. 9 by changing the optical density of the media 34 across a broad spectrum of optical densities for each resistance value selected by the variable resistor 40. As shown in FIG. 9, there are four curves, one for each of four values of the resistor 40. It is found that when chopping the light, each curve peaks but, depending upon the resistance value selected, the peak is at a different value of optical density. Thus, by selecting the proper loading of the photocell, the $\Delta V$ vs. optical density curves may be established to tune the validation apparatus to the particular security to be tested.

With reference now to FIG. 10, it can be seen that there is again provided a light source 32 which casts a light through a media 34 which is chopped by an appropriate moving grid or the like 44. The photocell 22 is interconnected between the inputs of the operational amplifier 24 as shown with the negative input thereof being loaded with the variable resistor 46. Of course, in standard fashion, a feedback resistor 48 is provided for appropriate gain. By utilizing the circuitry of FIG. 10 and varying the frequency of chopping of the moving grid 44, it was found that a family of curves relating the AC output signal $\Delta V$ of the amplifier 24 exists as shown in FIG. 11. Each curve of the family is developed at a different frequency of chopping of the light by means of the chopper 44. The curves themselves are developed by varying the optical density of the media 34 while maintaining the light chopping at a fixed frequency via the chopper 44. As can be seen, each of the family of curves peaks at the same value of optical density. As can further be seen, the curves are of a somewhat different shape than those heretofore developed; this difference being due to the cell leakage and capacitance characteristics of the photocell 22 which become apparent when light intensities to the photocell are dynamically changed.

With continued reference to FIG. 11, it can be seen that the operating points upon the curves for a photocopy are designated by the numeral 50 while the points on the curves for a valid security are designated by the numeral 52. It should be recalled, as mentioned hereinabove, that it has been found with most securities that the optical density of a valid security is quite different from that of a photocopy. However, when viewing the curves of FIG. 11, it becomes apparent that although the optical densities are greatly different, the output voltages of the sensing circuitry of FIG. 10 would be substantially the same and hence the circuitry would have no capability of differentiating between valid and invalid papers. An apparatus for circumventing this problem and capitalizing upon the differences in optical density between valid and invalid paper is shown in FIG. 12. Again, a light source 32 is cast through a media 34, a light chopper 44, and onto a photocell 22. Again, a variable resistor 46 is provided to load the cell 22 and input of the amplifier 24. To enhance the voltage differential resulting from the differences in optical density between the valid and invalid security, the variable resistor 46 which loads the cell 22 may be turned as discussed with respect to the circuitry of FIG. 8 to shift the curves of FIG. 11 to maximize the voltage differentials associated with the different optical densities. Another means of achieving this object is provided by including a dynamic feedback branch in shunt with the feedback resistor 48. A diode 54 may be so utilized and, although such a diode will drastically change the gain of the circuitry shown, it will have the result or effect of more widely separating the points 50 and 52 in the voltage spectrum. FIG. 13 shows the family of curves of FIG. 11 as the same are developed via the circuitry of FIG. 12, with the scale of FIG. 13 being on the order of magnitude less than that shown in FIG. 11. Quite clearly, the utilization of the diode 54 in the feedback circuit provides for an increase in gain with a decrease in DC input signal and hence a greater separation between the output voltages associated between media of different optical densities. It should be readily apparent that the voltages of the points 50 and 52 are now clearly separated and readily distinquishable from each other.

With further attention being given to the circuitry of FIG. 12, it should be briefly noted that the capacitor 56 is interposed for purposes of high frequency roll-off depending upon the frequency of chopping via the element 44. The capacitor 56 provides a dampening or smoothing effect. It should further be appreciated that the desired voltage separation of the points 50,52 may be readily achieved by either shifting curves via adjustment of the resistor 46 or by the utilization of a dynamic feedback network as achieved by utilization of the diode 54.

With an understanding of the operation of the circuitry of FIG. 12, an appreciation of the same in operation with a security validation apparatus may be had by reference to the structure of FIG. 14. A light source 16 is provided in juxtaposition to a tray 12 bearing the security 14 as discussed above. A reticle 18 is provided on a side of the security 14 opposite the lamp 16. Movement of the tray 12 and security 14 results in a chopping of the light passing from the lamp 16 and through the reticle 18 in standard fashion. The circuitry comprising elements 22, 24, 46, 48, 54, and 56 functions as described hereinabove with respect to FIG. 12. The output at 58 is then applied to a counter 60 which counts the number of output pulses from the amplifier 24 which number is determined by the characteristics of the reticle 18 and the grid upon the security 14 being tested. This count comprises one test of the validity of the security. Further, the counter 60 may include a peak-to-peak detector to insure that the swing of the output pulses from the amplifier 24 are within a particular level. The output 58 of the amplifier 24 is further applied to a threshold detector 62 which determines whether the output signal from the amplifier 24 is at a sufficient level (such as the point 52 shown in FIG. 13) to be indicative of the optical density of a valid security. If the output 58 from the amplifier 24 fails either the count or the peak-to-peak test of 60 or the threshold test of 62, an output signal is passed through either the diode 64 or the diode 66 to indicate a reject signal as at 68. In other words, the paper being passed as a valid security must pass both tests at 60 and 62 to be deemed a valid security and hence high quality photocopies may be easily rejected.

Figure 15:
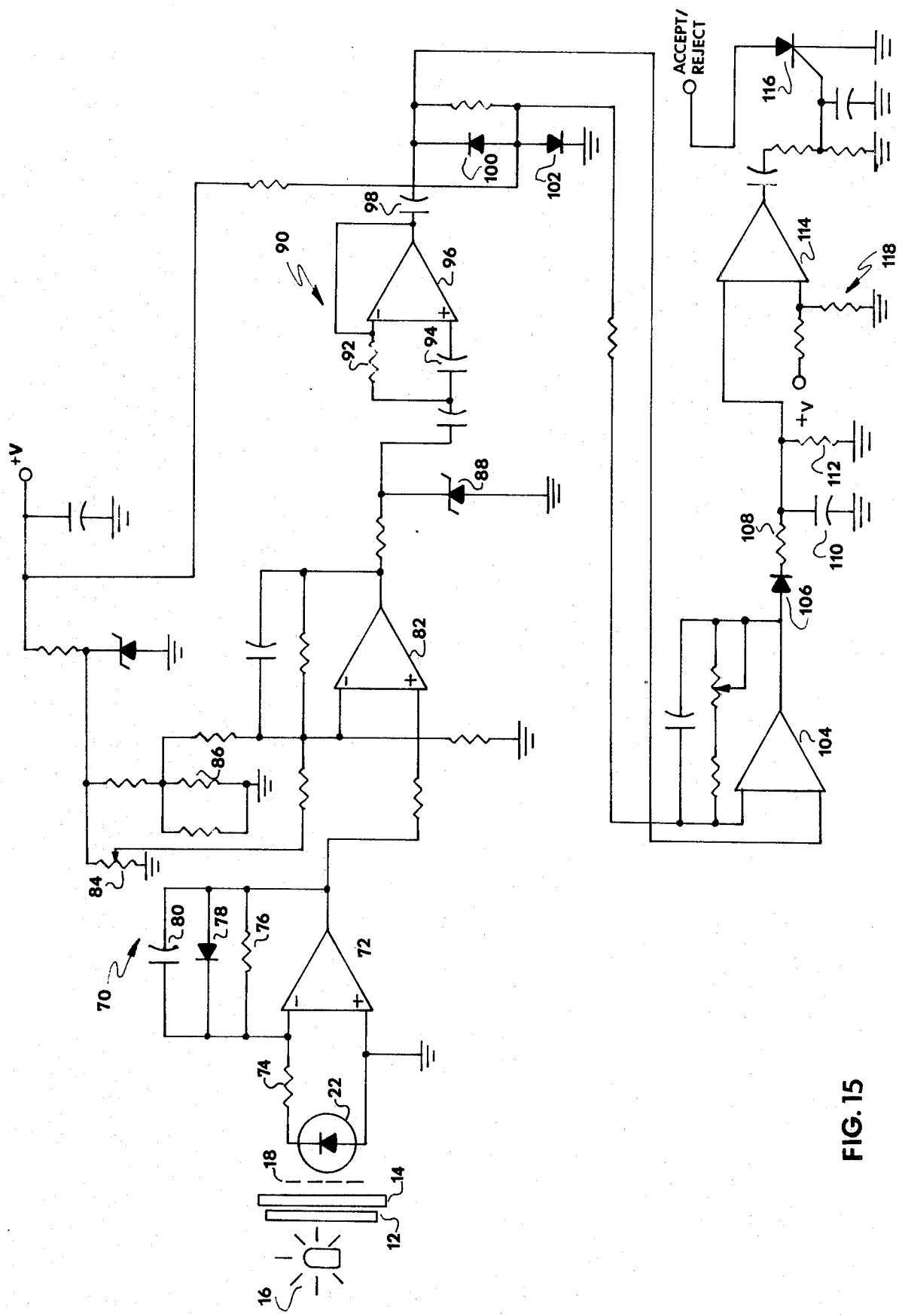
FIG. 15 is a detailed circuit schematic of an embodiment of the invention.

With reference now to FIG. 15, it can be seen that a detailed circuit 70 incorporating the teachings of the instant invention is presented. Here again, a lamp 16 is provided in juxtaposition to a tray 12 bearing the security 14 as discussed above. A reticle 18 is provided on a side of the security 14 opposite that of the lamp 16. Movement of the tray 12 and security 14 results in the chopping of the light passing from the light 16 and through the reticle 18 in standard fashion. This light impinges upon the photocell 22 which creates a signal which is passed through the input resistor 74 to the operational amplifier 72. The interconnection between the photocell 22 and the operational amplifier 72 via the input resistor 74 causes the cell 22 to operate fundamentally in the short circuit mode of operation and thus the amplifier 72 performs in a substantially linear fashion as discussed hereinabove. A high impedance feedback resistor 76 is provided as a limiter for low light levels inasmuch as the resistor 76, which may be on the order of 2.2 megohms, provides a feedback path for low light levels of less resistance than that of the diode 78. Again, and as discussed hereinabove, the diode 78 is provided for a dynamic feedback path while the capacitor 80 is interposed for purposes of high frequency rolloff and is selected according to the frequency of chipping to be determined by the reticle 18 and movement of the tray 12. The output of the amplifier 72, as will be appreciated by those skilled in the art, is of substantially constant AC signal strength regardless of the light level incident to the photocell 22 over a bandwidth of approximately 3 decades. Consequently, even if the lamp 22 becomes dim or the tray 12 becomes dirty, there will be no affect on the AC output signal from the amplifier 72. A high or low density note (determined generally by the age and wear of the note) will affect the DC output signal amplitude. Consequently, the output of the amplifier 72 will be an AC signal which is impervious to the affects of age and wear on either the note or the system and a DC signal proportional to the density of the note.

The output from the amplifier 72 is amplified via the operational amplifier 82. A potentiometer 84 is connected to the negative input of the amplifier 82 to provide an offset voltage for setting the reference level of the output signal from the amplifier 82. Further, a thermistor 86 is connected to this negative input for purposes of temperature compensation for the affects of the diode 78. Consequently, the output of the amplifier 82 is an AC signal riding on a DC signal minimally affected by temperature changes via the thermistor 86 and at a referenced voltage level determined by the potentiometer 84.

As can be seen, the output from the amplifier 82 is blocked by means of a zener diode 88 in such a manner that no AC signal will be present for coupling to the amplifier 96 after a particular DC level has been reached. This zener diode 88 sets the lower level of a fixed domain of optical density within which the system will operate. The upper level of this optical density domain is determined by the ground point of the operational amplifier 82. Consequently, the system being described looks at a certain optical density domain inasmuch as no signal will be available for passing to the operational amplifier 96 unless the optical density of the security being tested falls within a particular domain.

A high pass filter stage 90 comprising resistor 92, capacitor 94, and operational amplifier 96 receives the output from the amplifier 82 if the same falls within the aforesaid domain. The output of the high pass filter 90 is coupled via the capacitor 98 to the amplifier 104. Diodes 100, 102 are provided in the input circuit to the amplifier 104 for purposes of offsetting or providing a reference level for the AC wave amplitude coupled via the capacitor 98.

The output of the amplifier 104, being amplified and shifted with respect to a reference voltage level, is rectified via the diode 106. This rectified signal is then passed to the integrating circuit comprising resistors 108, 112 and capacitor 110. The integrated signal is then passed to a comparator 114 which operates in standard fashion and, upon sensing that the integrated signal is of appropriate amplitude as selected by the voltage divider 118 to be indicative of a valid security, emits an output signal which triggers the SCR 116 to accept the note as indicated.

Thus it can be seen that the objects of the invention have been achieved by the apparatus presented hereinabove. While in accordance with the patent statutes, only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. Apparatus for performing tests for determining the validity of a paper purported to be a valid instrument, comprising:
    a light source;
    a reticle in juxtaposition to and receiving light from said light source;
    means interpositioned between said light source and said reticle for receiving the paper and providing relative movement between said reticle and the paper, such movement chopping the light passing from said source and through said reticle; and
    sensing means operatively connected to said reticle for receiving the light passing therethrough and generating an electrical signal therefrom, said sensing means testing such light as to the frequency of such chopping from an AC component of said signal, and the optical density of the paper, from a DC component of said signal, to determine the validity of the paper and further including means for establishing first and second optical density levels defining an optical density domain within which a valid instrument must lie.

2. The apparatus as recited in claim 1 wherein said sensing means includes a photocell receiving the light passing through said reticle and a first amplifier connected to said photocell, said first amplifier having a dynamic feedback circuit.

3. The apparatus as recited in claim 2 wherein said dynamic feedback circuit includes a feedback diode in shunt with a feedback resistor.

4. The apparatus as recited in claim 3 wherein said sensing means further includes a second amplifier connected to and receiving an output signal from said first amplifier, said second amplifier including temperature compensation means.

5. The apparatus as recited in claim 2 wherein said sensing means further includes a second amplifier connected to and receiving an output signal from said first amplifier, said second amplifier having a characteristic saturation voltage level associated with said first optical density level and a voltage limiter connected thereto and associated with said second optical density level.

6. The apparatus as recited in claim 2 wherein said sensing means further includes an integrating circuit operatively connected to and receiving an output signal from said first amplifier.

7. The apparatus as recited in claim 6 wherein said sensing means further includes a comparator circuit connected to and receiving an output signal from said integrating circuit the amplitude of which, as determined by said comparator circuit, determines the validity of the paper.

8. A device for determining the validity of a paper instrument having a characteristic grid pattern thereon, comprising:
    a light source;
    a reticle, complementary with said grid pattern, in juxtaposition to and receiving light from said light source;
    means interposed between said light source and reticle for maintaining the instrument and affectuating relative movement between said reticle and the instrument, such movement bringing the grid pattern and reticle into and out of registration and chopping the light passing from said source and through said reticle;
    a photocell operatively connected to said reticle and receiving light passing therethrough;
    a first amplifier connected to said photocell and including a dynamic feedback network said first amplifier presenting an output signal consisting of both AC and DC components, said AC component corresponding to the frequency at which such registration is achieved, and said DC component corresponding to the optical density of the paper; and
    means connected to and receiving an output signal from said first amplifier for setting first and second optical density levels defining a domain within which a valid instrument must fall.

9. The device according to claim 8 wherein said dynamic feedback network comprises a diode in shunt with a resistor.

10. The device according to claim 9 which further includes a second amplifier having temperature compensation means and being connected to and receiving an output signal from said first amplifier.

11. The device according to claim 8 wherein said last said means comprises a second amplifier having a characteristic lower level setting said first optical density level associated with the instrument and further including a voltage limiter setting said second optical density level associated with the instrument.

12. The device according to claim 11 which further includes an integrating circuit connected to and receiving an output from said second amplifier, said output being a function of the characteristics of the grid pattern and the optical density of the instrument.

13. The device according to claim 12 which further includes a comparator circuit connected to and receiving an output from said integrating circuit, the amplitude of which determines the validity of the instrument.

* * * * *